United States Patent [19]

Lundquist et al.

[11] Patent Number: 5,581,137
[45] Date of Patent: Dec. 3, 1996

[54] MOTOR MULTIPLE SWITCHES AND CIRCUITRY

[76] Inventors: Lynn C. Lundquist, 10833 NE. Russell, Portland, Oreg. 97220; John D. Morris, 1205 SE. 143rd, Portland, Oreg. 97233

[21] Appl. No.: 499,734

[22] Filed: Jul. 7, 1995

Related U.S. Application Data

[63] Continuation-in-part of Ser. No. 993,127, Dec. 18, 1992, Pat. No. 5,483,029.

[51] Int. Cl.⁶ .......................... H01H 9/00; H01H 19/02; H02K 11/00
[52] U.S. Cl. .................... 310/68 R; 200/1 B; 200/8 R; 310/68 A; 310/71
[58] Field of Search ...................... 200/1 R, 5 R, 200/8 R, 8 A, 11 R, 11 A–11 TW, 16 R, 16 A–16 F, 50.15–50.26, 1 B; 310/68 R, 68 A, 68 B, 71

[56] References Cited

U.S. PATENT DOCUMENTS

| | | | |
|---|---|---|---|
| 2,307,595 | 1/1943 | Lingal | 200/8 R |
| 2,692,363 | 10/1954 | Moody et al. | 318/252 |
| 3,324,259 | 6/1967 | Chamberlin et al. | 200/50.15 |
| 3,348,003 | 10/1967 | Mrenna | 200/50.18 |
| 3,471,658 | 10/1969 | Elliott | 200/8 R |
| 3,780,245 | 12/1973 | Beddow | 200/564 |
| 3,970,808 | 7/1976 | Gryctko et al. | 200/50.15 |
| 4,017,698 | 4/1977 | Kuhn et al. | 200/50.21 |
| 4,020,301 | 4/1977 | Ericson et al. | 200/50.26 |
| 4,160,885 | 7/1979 | Ellicott et al. | 200/1 R |
| 4,572,930 | 2/1986 | Kakuta et al. | 200/5 R |
| 4,748,355 | 5/1988 | Anderson et al. | 310/71 |
| 4,914,262 | 4/1990 | Appleton | 200/8 R |
| 5,061,833 | 10/1991 | Hodder et al. | 200/255 |
| 5,483,029 | 1/1996 | Lundquist et al. | 200/1 R |

OTHER PUBLICATIONS

Sales brochure/Integral Starters/Telemecanique Inc.

*Primary Examiner*—J. R. Scott
*Attorney, Agent, or Firm*—Lynn Lundquist

[57] ABSTRACT

This apparatus incorporates an electric motor disconnecting safety switch within the motor's electrical terminal housing. This results in a single, compact device directly mounted to the electric motor body which is used for the safety disconnect as well as the termination point for the incoming power leads and the motor wire taps. The apparatus may be employed as a disconnecting device for single phase and three phase alternating current motors as well as various configurations of direct current motors. The apparatus further includes a simple and economical adapter plate mounting configuration which accommodates the device to a multiplicity of motor frames. This apparatus is used in three embodiments: the first being a rotary tumbler switching device with an external rotary hand operator; the second device being a draw-out disconnecting means; the third device including an integral motor starter which provides both disconnecting and motor controlling functions.

22 Claims, 7 Drawing Sheets

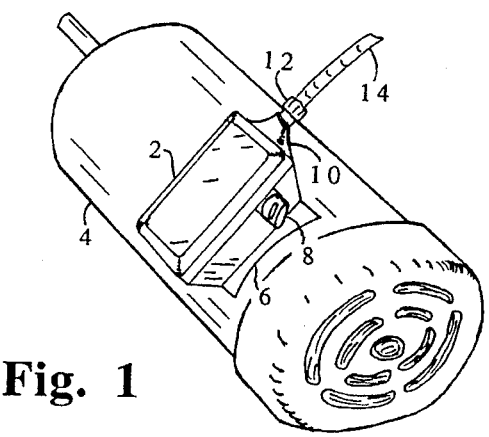
Fig. 1
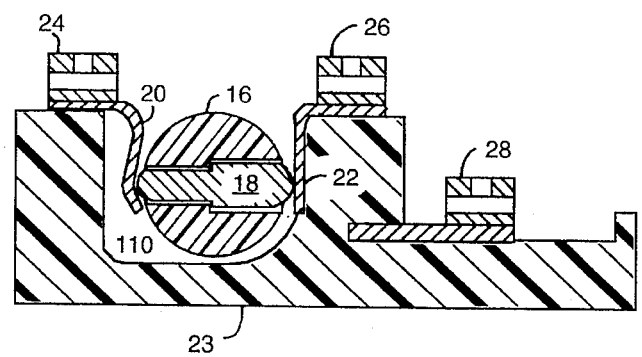
Fig. 2a
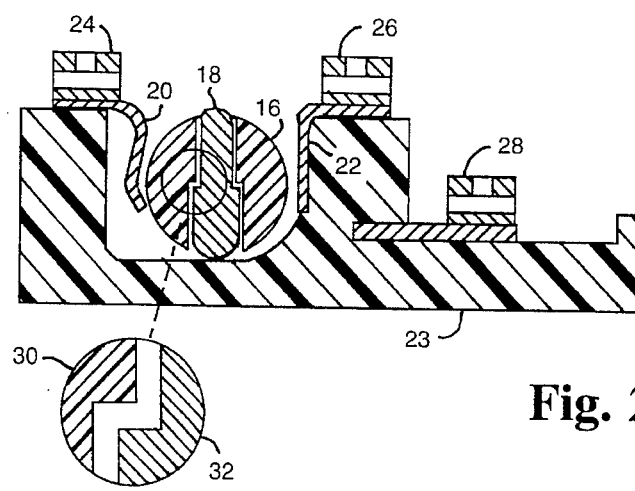
Fig. 2b
Fig. 2c

MOTOR MULTIPLE SWITCHES AND CIRCUITRY

DIVISION OF APPLICATION

This is a continuation-in-part of application Ser. No. 07/993,127, filed on Dec. 18, 1992, now U.S. Pat. No. 5,483,029.

BACKGROUND-FIELD OF THE INVENTION

This apparatus provides an electrical disconnecting switch which is incorporated into the motor terminal housing.

The National Electrical Code (NEC) as published by the National Fire Protection Association requires that "A [motor] disconnecting means shall be located in sight from the motor location and the driven machinery location." (NEC 430-102 (b). Thus, a mechanical means is required which can be used to electrically disconnect the machinery motor from the incoming electrical power lines, and must be located within a specified proximity to the motor and equipment which it disconnects.

This invention has incorporated a disconnecting switch of a type acceptable to the National Electrical Code into a housing which is adjacently affixed to the motor and which also serves as the required motor terminal housing wherein the incoming power lines are electrically connected to the electrical windings of the motor.

1. Background-Description of the Prior Art

Within the present art, electrical isolation of motors is generally achieved in one of two apparatus. In the first case, an electrical disconnect device is located within sight of the motor. Subsequently, the incoming electrical power lines to the motor are passed through, and may be de-energized by, the disconnect device.

In a second case, the disconnect device is distant from the motor location and may be incorporated into a motor control center. Provision is made within this remote location to de-energize the motor's incoming electrical power lines by means of a disconnecting device which can be locked in an open (de-energized) position.

In either case, the objective of the disconnecting device is to provide both protection to personnel and equipment during routine maintenance and ready access to a disconnecting means in the event of an emergency.

When properly installed according to the requirements of the National Electrical Code, the installation of a disconnecting device adjacent to the motor equipment being protected or in a motor control center provides the minimal required personnel and equipment protection. It has the disadvantage, however, of requiring an additional electrical device within the incoming electrical power lines servicing the motor. Further, it may be located such that it is not convenient for maintenance personnel to manipulate or verify during service.

The apparatus presented herein is a significant advance over the prior art in that it has incorporated the function of the electrical disconnecting device and the motor terminal housing into a single device affixed to the electric motor. The ensuing advantages of a disconnecting means which is affixed to the motor it is protecting is in the added safety of the disconnecting means immediately adjacent to the motor. In addition to safety advantages, economic advantages are gained by reducing the complexity of the electrical installation.

2. Objectives of the Invention

This apparatus was developed with an understanding of the limitations of the present technology employed in the electrical disconnecting means for an electric motor installation and., further, with a view to the requirements and intent of the National Electrical Code.

1. It is the general objective of this apparatus to provide a disconnecting means mounted directly to the electric motor which is served by the disconnecting means.
2. Another objective of this apparatus is to integrate the disconnecting means and the motor terminal housing into a single enclosure, or adjoining enclosures.
3. Another objective of this apparatus is to incorporate a means of disconnecting all incoming electrical power lines to the motor simultaneously with a single operator motion.
4. Another objective of this apparatus is to provide a means for de-energizing the motor control circuit simultaneously and from the same location as the motor disconnect device. (The term simultaneously does not preclude the intended function of a control circuit break prior to the disconnection of the service leads.)
5. Another objective of this apparatus is to provide a disconnecting device which will accommodate typical dual voltage and wye or delta wound alternating current motors.
6. Another objective of this apparatus is to provide a disconnecting means for direct current motors.
7. Another objective of this apparatus is to provide multiple embodiments of the disconnecting means.
8. Another objective of this apparatus is to provide both a disconnecting means and a motor controlling means within a single enclosure affixed to an electric motor.
9. A final objective of this apparatus is to provide a universal disconnecting device which may be adapted to individual manufacturers' motors by means of an adapter plate.

These and other objectives and advantages of the present apparatus, and the manner in which they are achieved, will become apparent in the following specifications and claims.

SUMMARY OF THE INVENTION

The present apparatus provides an electrical disconnecting switch which is incorporated into the motor terminal housing. The terminal housing performs a first function of an electrical termination point for the incoming power lines with the motor leads, as well as the junction box where motor lead taps are connected for the appropriate voltage utilization of the motor. Additionally, this apparatus provides a second function of a disconnecting means for de-energizing the motor while locking the disconnect in the de-energized state. In a further development, this apparatus additionally provides a motor controller function contained within the terminal housing.

All embodiments include motor tap wire connection provisions within the terminal housing in either the form of designated terminals or open space for the connections. However, extraneous to these tap wire connections, two embodiments achieve solely a disconnecting function. In the preferred disconnecting embodiment, a rotary tumbler arrangement is located between a series of line connection lugs and the terminal lugs leading to the motor. As the tumbler is rotated, the conducting elements selectively open or close the line connections to the motor. Additionally, an auxiliary contact is provided which disconnects the motor controller. As will be seen within the body or this disclosure, the number of line poles may be modified for single or three phase alternating current applications or further, the apparatus may be employed as a direct current motor disconnect device.

In a second disconnecting embodiment, the device consists of a draw-out arrangement which opens the line leads to the motor. This embodiment is generally intended as a lower cost application of the concept. As in the case of the rotary embodiment, auxiliary contacts may be employed to de-energize the motor controller. The number of poles is determined by the application.

The third embodiment of this apparatus includes a motor controller in conjunction with the motor disconnect. A compact combination motor controller/disconnecting device (known in the electrical trade as an integral starter) is incorporated into the device. In this embodiment, the four functions of terminal connection, motor controler, motor overload protection and motor disconnect are incorporated into the single motor-affixed housing.

This apparatus further addresses the design of a motor adaptor plate which will mate the universal device to a given motor manufacturer's motor frame. In an alternate embodiment, the junction box function where motor lead taps are connected is extraneous to the disconnecting functions, though adjacently joined to the disconnect enclosure. The junction box function is moved to an enlarged adaptor plate.

Significant advantages ensue from this combined disconnect, terminal housing, and (when used) motor controller arrangement. From the standpoint of safety and convenience, this device is directly attached to the motor for which protection is required. Safety and convenience are greatly enhanced because of the immediate proximity of the disconnect with the protected equipment.

Additional advantages are apparent in the reduced cost for a motor driven installation. The total cost of labor and materials for a single device on the motor is less than the installed cost of separately located disconnecting (and motor starting) devices and their necessary conduit installations.

BRIEF DESCRIPTION OF THE DRAWINGS

FIG. 1 is a perspective view of a first embodiment mounted on an electric motor.

FIG. 2a is a sectional view of closed tumbler contacts at 2—2 of FIG. 4.

FIG. 2b is a sectional view of open tumbler contacts at 2—2 of FIG. 4.

FIG. 2c is a sectional view of the tumbler internal shoulder and contact pin shoulder.

DESCRIPTION OF THE PREFERRED EMBODIMENTS

Figure 3:
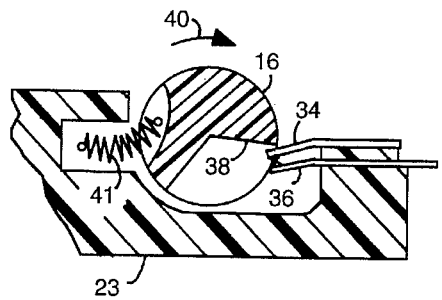
FIG. 3 is a sectional view of closed auxiliary contacts at 3—3 of FIG. 4.

To simplify the description, symmetrical parts, or portions of a single part where divided by a sectional view, will be designated with a prime ('). The description of the part(s) having primed reference characters will be limited. Further, to avoid unnecessary detail in both the drawings and specifications, the identification and explanation of construction details which would normally be required for the finished product are omitted if they do not contribute to the understanding of the unique qualities of this device.

Referring now to FIG. 1, the motor mounted disconnecting device 2 is shown affixed to a typical electric motor 4. By means of an adapter plate 6, a universal motor mounted disconnecting device 2 is readily adapted to each manufacturer's motor 4 in place of the supplied terminal housing. The device has an easily assessable, externally mounted hand operator 8. The disconnecting device 2 is supplied with a threaded connector boss 10 to which a conduit connector 12 is connected, and subsequently, the conduit 14 for the electrical connection of the motor 4 to the power source.

FIG. 2a shows the preferred embodiment which employs a tumbler 16 constructed of an insulating material. A contact pin 18 passes through the tumbler 16 in such a manner that simultaneous electrical contact is made with a resilient line terminal member 20 and a rigid load terminal member 22 when the device is in the energized position. Each phase or electrical conductor is controlled by a single contact pin 18.

To establish a completed electrical circuit, an incoming power supply line conductor is terminated on the electrically isolated line connection lug 24 which is in electrical contact with the line terminal member 20. Similarly, an electrically isolated load lug 26 is in electrical contact with the rigid terminal member 22 so that the electrical circuit is completed between the corresponding line lug 24 and load lug 26. (The line lugs 24 and 24' are identified in subsequent figures by preferred electrical nomenclature as L1, L2, and L3. The load lugs 26 and 26' are similarly identified as T1, T2, and T3.) In all subsequent descriptions and drawings, it is to be understood that the mounting material 23 for the electrically conductive sub-assemblies is of a highly resistive, non-conductive substance. Thus, all conductive members (such as line lugs 24, load lugs 26, line terminal member 20 and rigid terminal member 22) are electrically isolated from each other unless in intentional contact with another conductive element.

Also shown in FIG. 2a is a motor tap lug 28. Though not essential to the operation of the disconnecting device, the tap lug 28 is conveniently used to terminate motor tap wires in dual-voltage motor applications.

FIG. 2b is similar to FIG. 2a with the exception that the tumbler 16 has been rotated to the de-energized position wherein the contact pin 18 is electrically isolated from both the line terminal member 20 and the rigid load terminal member 22.

FIG. 2b amplifies the detail of a tumbler internal shoulder 30 which interferes with a contact pin shoulder 32, thus preventing the contact pin 18 from dislodging from the tumbler 16. The contact pin 18 "floats" in the tumbler 18 body which allows unrestricted contact between conductive members.

FIG. 3 shows the detail of the auxiliary contacts. A moving auxiliary contact 34 is moved into electrical contact with a stationary contact 36 by the cam portion 38 of the tumbler 16 at cross section 3—3 of FIG. 4. The auxiliary contacts 34 and 36 are brought into electrical contact by the cam portion 38 of the tumbler 16 when the tumbler is rotated to the energized position as indicated by arrow 40.

FIG. 3 also shows a toggle spring 41 which causes the tumbler 16 to snap to either the open or closed position.

Figure 4:
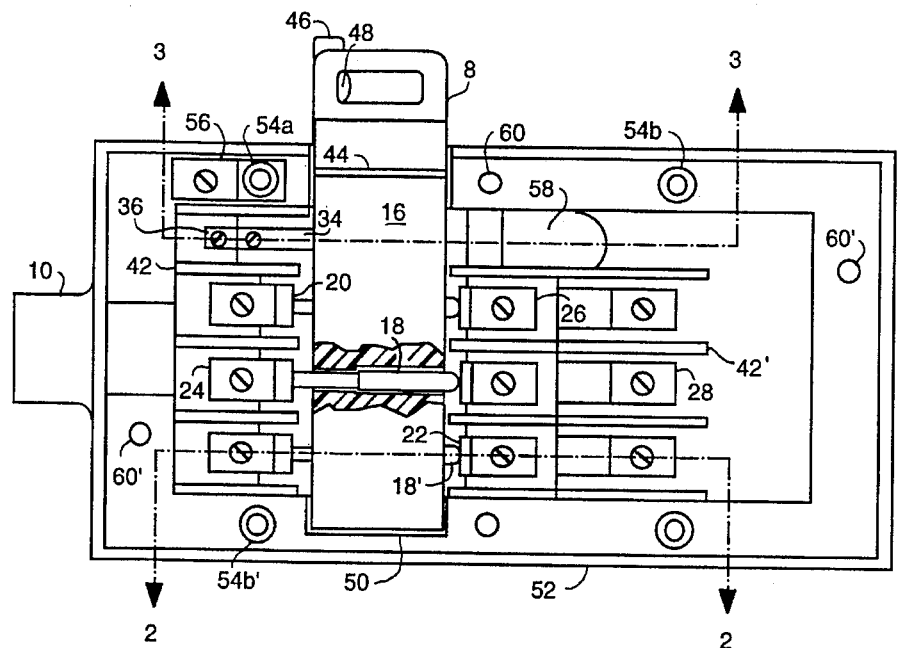
FIG. 4 is a plan view of the contact portion of the device.

FIG. 4 is a plan view of the preferred embodiment showing the relationship of each of the functioning elements. The tumbler 16 is shown in the energized position where the contact pins 18 are making contact with the line terminal member 20 and the load terminal member 22 which are in electrical contact respectively with the line lugs 24 and the load lugs 26. (To avoid drawing complexity, not all items are designated with legend numbers when the detail is identical to an identified detail.) The terminal portions of the moving auxiliary contact 34 and the stationary auxiliary contact 36 are also shown. The bare metal parts of each phase is separated by an insulating partition 42.

In this view, more complete detail is shown of the tumbler 16, including an "O" ring groove 44 used to provide a NEMA 4 (weatherproof) construction of the case. The tumbler 16 has a hand operator 8 which is used to manipulate the tumbler assembly. Additionally, there is provision for locking the tumbler 16 in the de-energized position by sliding the thumb tab 46 which opens a lockout slot 48 and locks the tumbler assembly in the de-energized position (as will be shown in FIG. 5). The tumbler assembly fits into a depression at 50 which physically holds the assembly in location without requiring an opening in the disconnecting device body 52 which would compromise rain tight construction.

The disconnecting device body 52 is secured to the adapter plate 6 by mounting fasteners 54. Three mounting fasteners 54b merely secure the device body 52 to the adapter plate; grounding fastener 54a additionally provides the conductive means between the ground lug 56 and the metal portions of the motor. A hollowed portion of the device body provides a wire channel 58 for the motor leads. A threaded connector boss 10 is provided adjacent to the line lugs 24 which will accommodate a threaded conduit connector 12. Cover mounting threaded holes 60 are also provided.

Figure 5:
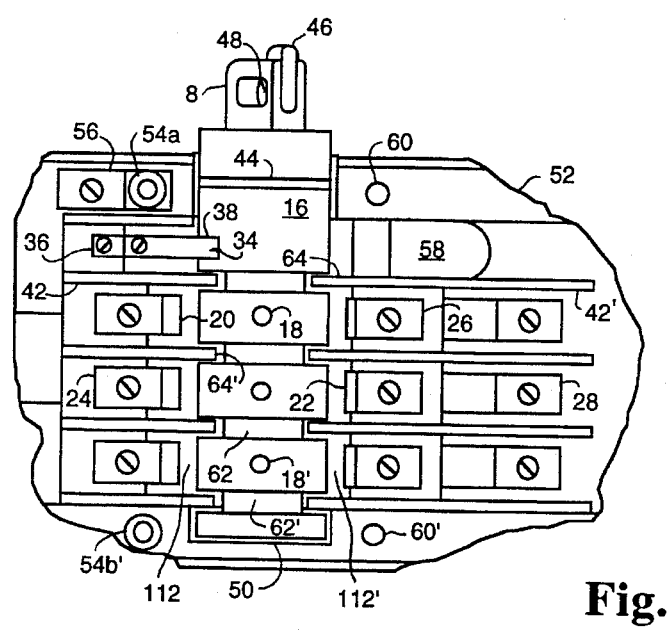
FIG. 5 is a partial plan view of the contact portion of the device showing an arc shielding configuration.

FIG. 5 shows another embodiment wherein the tumbler 16 has annular grooves 62 which increase the linear distance between contact pins 18. This increased linear distance, in conjunction with the portion of the insulating partition projection 64 which extends into the annular groove 62 provides an arc suppression chamber when the contacts are opened under load. This figure also shows the cam portion 38 of the tumbler 16 as seen in this view when the tumbler 16 is rotated to the open position.

Figure 6:
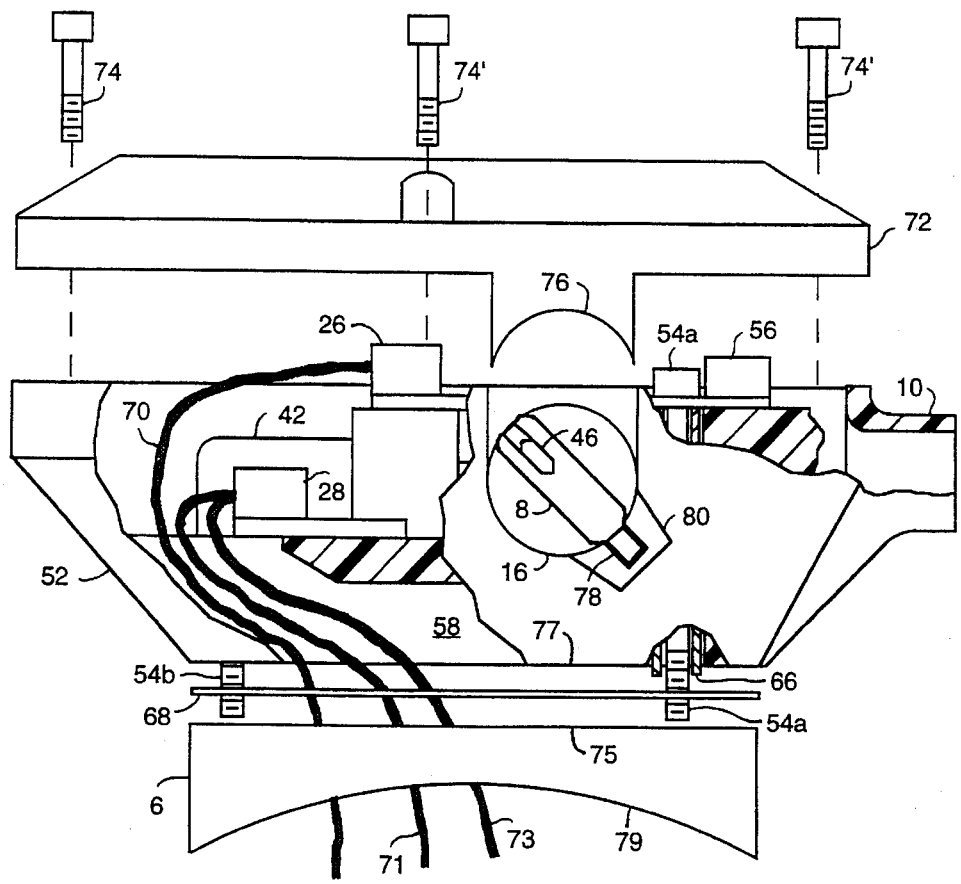
FIG. 6 is an elevation and partial sectional view of the device.

FIG. 6 shows the detail of an elevation view of the preferred embodiment. The disconnecting device body 52 is secured to a motor adaptor plate 6 by the mounting fasteners 54. The grounding fastener 54a is in electrical contact with the ground lug 56 and the metal motor adapter plate 6. To further enhance electrical conductivity, a grounding sleeve 66 is mounted in compression which directly bears against the ground lug 56 and the adaptor plate 6. It should be noted that the adaptor plate gasket 68 is so constructed that it provides clearance in the area of the grounding sleeve 66, so that the grounding sleeve 66 is in direct electrical contact with the conductive adapter plate 6.

The provision for the motor leads is shown in this view. The wire channel 58 is shown as a cavity wherein the motor load lead wires 70 are routed from the motor proper, through the adapter plate 6 and subsequently to the motor load lugs 26. Additionally, motor tap lugs 28 are used to connect internal motor connections 71 and 73 which represent field selectable motor tap wires which are extraneous to the function of the rotary switching device but are requisite to the electrical connection of the electric motor itself. That is, in the typical three phase motor, wire leads as represented by 71 and 73 extend from the motor to the terminal area which allow the motor to be field wired for either delta or wye connections.

The adaptor plate 6 has an upper mounting surface 75 which conforms to a lower housing mounting surface 77 and a lower adaptor plate mounting surface 79 which conforms to the case configuration of a particular motor.

The body cover 72 and cover fasteners 74 are shown in this view. An extended portion 76 of the cover is shown which forms a weather proof seal around the tumbler 16 and with the device body 52. The tumbler 16 is shown in the locked position with the thumb tab 46 depressed which extends the locking tab 78 into a notch formed into the lock seat 80 molded into the device body 52.

Figure 7A:
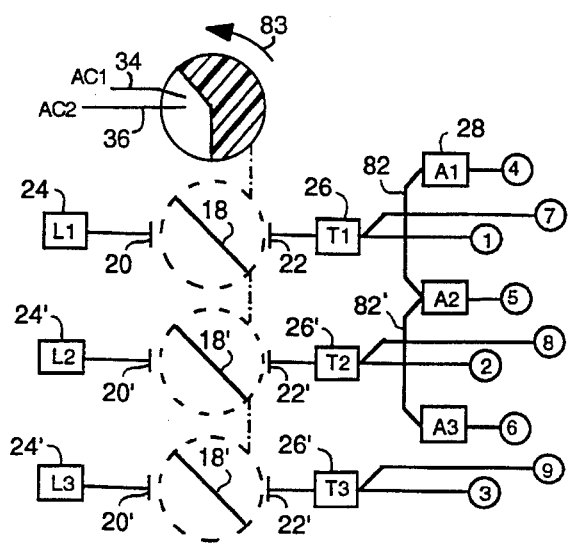
FIG. 7a is a schematic representation of the device wired for a low voltage, wye connected three phase alternating current motor.

FIG. 7a shows the schematic for the device in the de-energized position when it is used for a low voltage, wye connected three phase motor. In this application, the motor tap lugs 28 are made common with a jumper 82 and serve as a termination point for the motor wire numbers conventionally designated as 4, 5, and, 6. Motor wire number 7 is terminated with wire number 1 at the load lug 26 T1. Similarly, wires number 8 and 2, and wires number 9 and 3 are terminated respectively under load lugs 26' T2 and T3. When the tumbler 6 is rotated in the direction of arrow 83 the auxiliary contacts 34 and 36 are closed, followed by the completion of the circuits by the contact pins 18 between the respective line terminal members 20 and motor terminal members 22.

Figure 7B:
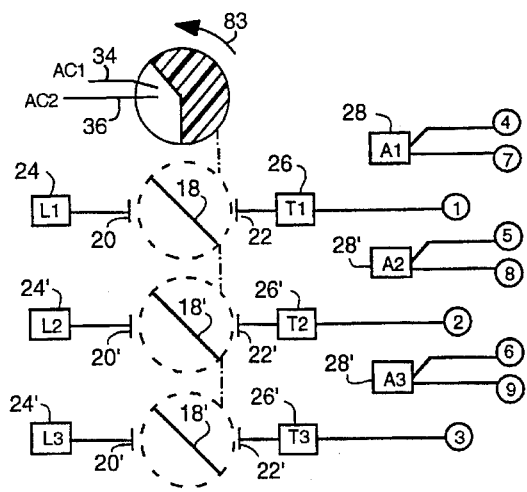
FIG. 7b is a schematic representation of the device wired for a high voltage, wye connected three phase alternating current motor.

FIG. 7b is the schematic for a high voltage wye connected motor where the motor tap lugs are used to connect internal motor connections without a jumper. The manner of electrical contact function is identical to that described in FIG. 6.

Figure 7C:
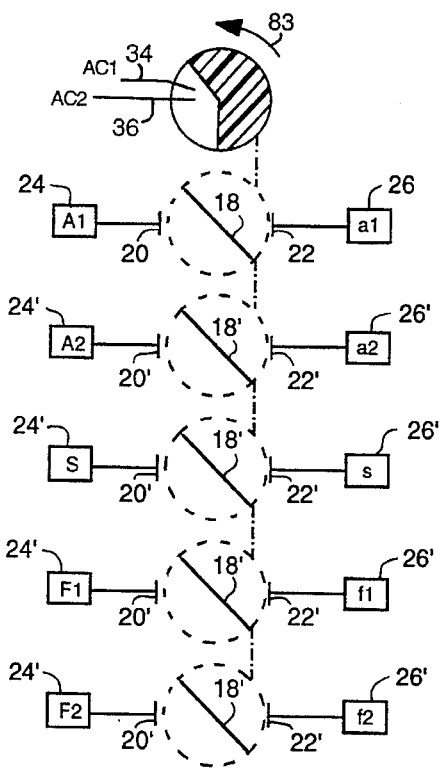
FIG. 7c is a schematic representation of the device wired for a direct current motor.

FIG. 7c is a schematic representation of the device when used on a direct current motor. In this application if the motor is connected with a series field, a total of five motor contacts are used in addition to the auxiliary contacts. The line lugs 24 (and corresponding load lugs 26) are used as follows: terminals A1 and A2 are used for the armature connections, terminal S is used for the series field coil, and, terminals F1 and F2 are used for the shunt field. Again, the manner of electrical contact function is identical to that described in FIG. 7a wherein rotation of the tumbler 16 in the direction of arrow 83 closes the auxiliary contacts 34 and 36 first, followed by the completion of the circuits by the contact pins 18 between the respective line terminal members 20 and load terminal members 22.

Figure 8:
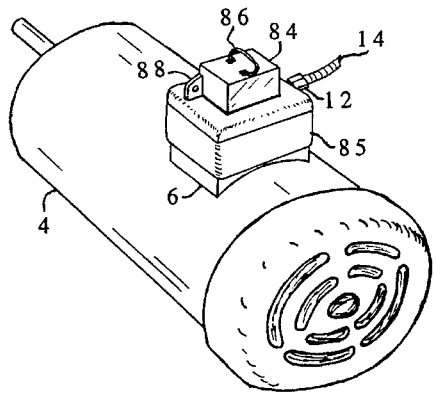
FIG. 8 is a perspective view of a second embodiment mounted on an electric motor.

FIG. 8 is a perspective view of a second embodiment. In similar fashion to the first embodiment, an adaptor plate 6 is used to mate the disconnecting device 85 to the electric motor 4. Additionally, a threaded connector boss 10 (which is shown in FIG. 9) is used to secure the conduit connector 12 and the attached conduit 14.

As seen from this perspective view, the apparatus has a telescoping draw-out assembly 84 which is withdrawn by the use of a bail handle 86 or similar device. A telescoping lock-out tab 88 is affixed to the draw-out assembly 84 so that the device may be locked in the de-energized position.

Figure 9:
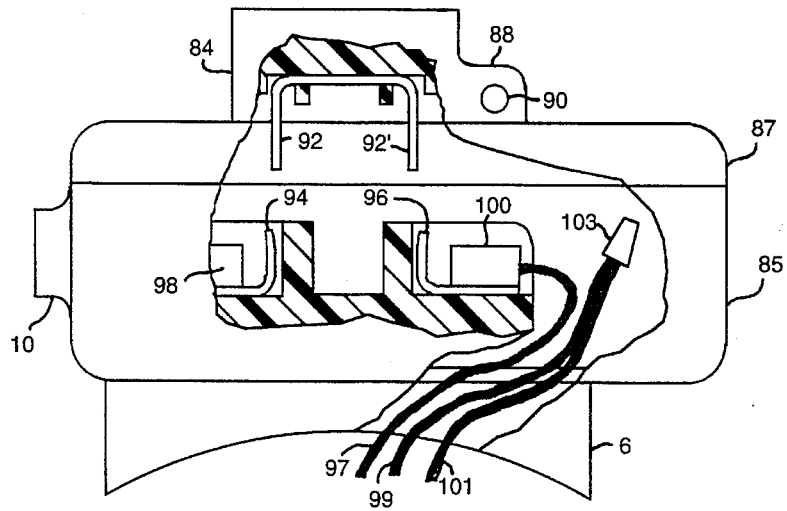
FIG. 9 is an elevation and partial sectional view of a second embodiment.

FIG. 9 better demonstrates the working details of the second embodiment. The telescoping lock-out tab 88 is shown in greater detail as being a molded portion of the draw-out assembly 84 which is shown in the extended position. A locking device (such as a padlock) can be attached to the lock-out tab hole 90 to prevent accidental energizing of the motor circuit.

The phase conductive member consists of a movable contact 92 element formed from a single piece of conductive material. In the de-energized position, the movable contact 92 is not in physical contact with other conductive elements of the device. A motor load lead 97 is shown terminated on a load lug 100. The enclosure provides additional space where motor tap connections extraneous to the load side electrical connections may be connected. Motor tap wire leads 99 and 101 are connected by a wire nut connector 103 in this space.

The device has a top cover 87 secured by appropriate fasteners.

Figure 10:
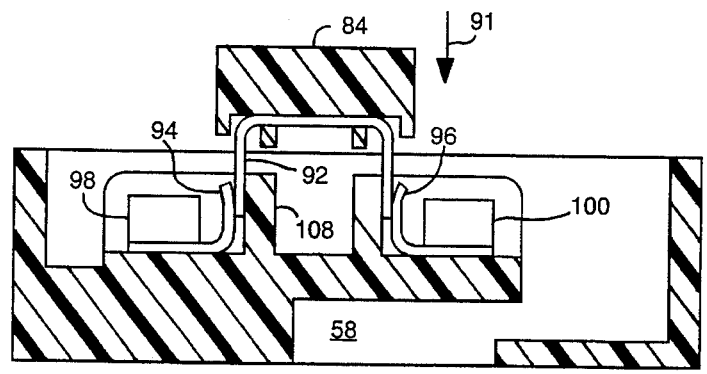
FIG. 10 is a sectional view of a second embodiment.

FIG. 10 is a sectional view showing how the device of the second embodiment is positioned in the energized state. The draw-out assembly 84 is forced into the energized position as indicated by arrow 91 which causes the movable contact 92 to simultaneously make contact with the line contactor 94 and the load contactor 96 which are in electrical contact with the line lug 98 and load lug 100 respectively.

As shown in the previous embodiment, this device also has a wire channel 58 through which the motor leads are connected to their respective termination points.

Figure 11:
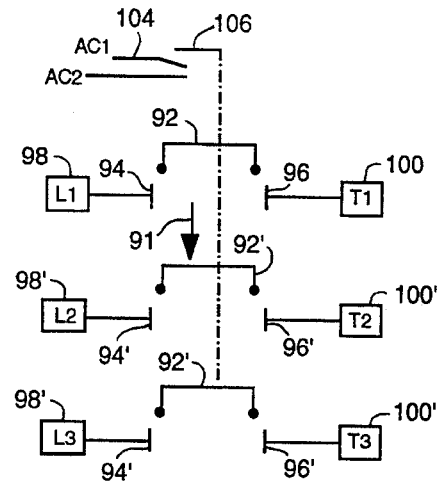
FIG. 11 is a schematic representation of the second embodiment.

FIG. 11 schematically represents the second embodiment. The line lugs 98 (which are conventionally designated as L1, L2, and L3) are in electrical contact with the line contactor 94 whereas the load lugs 100 (which are conventionally designated as T1, T2, and T3) are in electrical contact with the load contactor 96. When the coupled movable contacts 92 are closed (as indicated by arrow 91 ), the circuit is energized.

Auxiliary contacts 104 may also be used in the second embodiment. In this case, they are mechanically closed by an insulated member 106 of the draw-out assembly 84.

Figure 12:
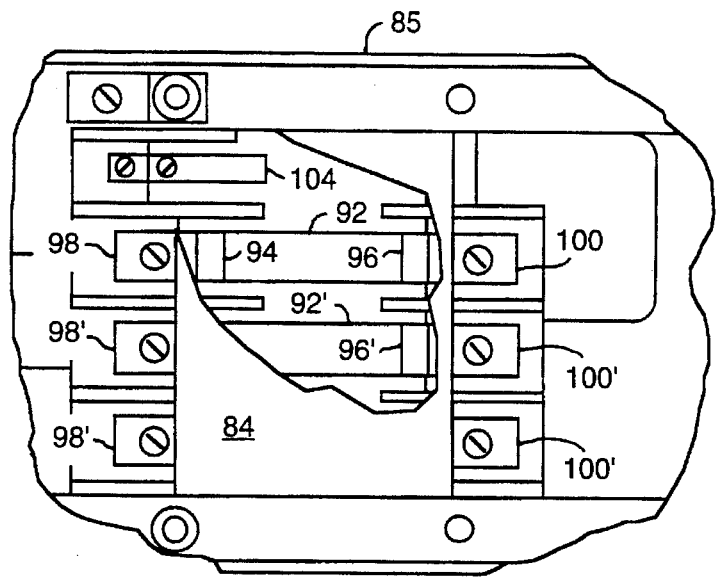
FIG. 12 is a plan view of the contact portion of a second embodiment

FIG. 12 shows in greater detail the multiple circuits of the device of the second embodiment. A circuit for any one of the motor phase leads would be made from the line lug 98, which is common with the line contactor 94, to the movable contact 92. On the load side, the movable contact 92 completes the circuit to the load contactor 96 which is common with the load lug 100. The auxiliary contacts 104 are more clearly shown in this figure as being electrically isolated from the motor phase leads.

Figure 13:
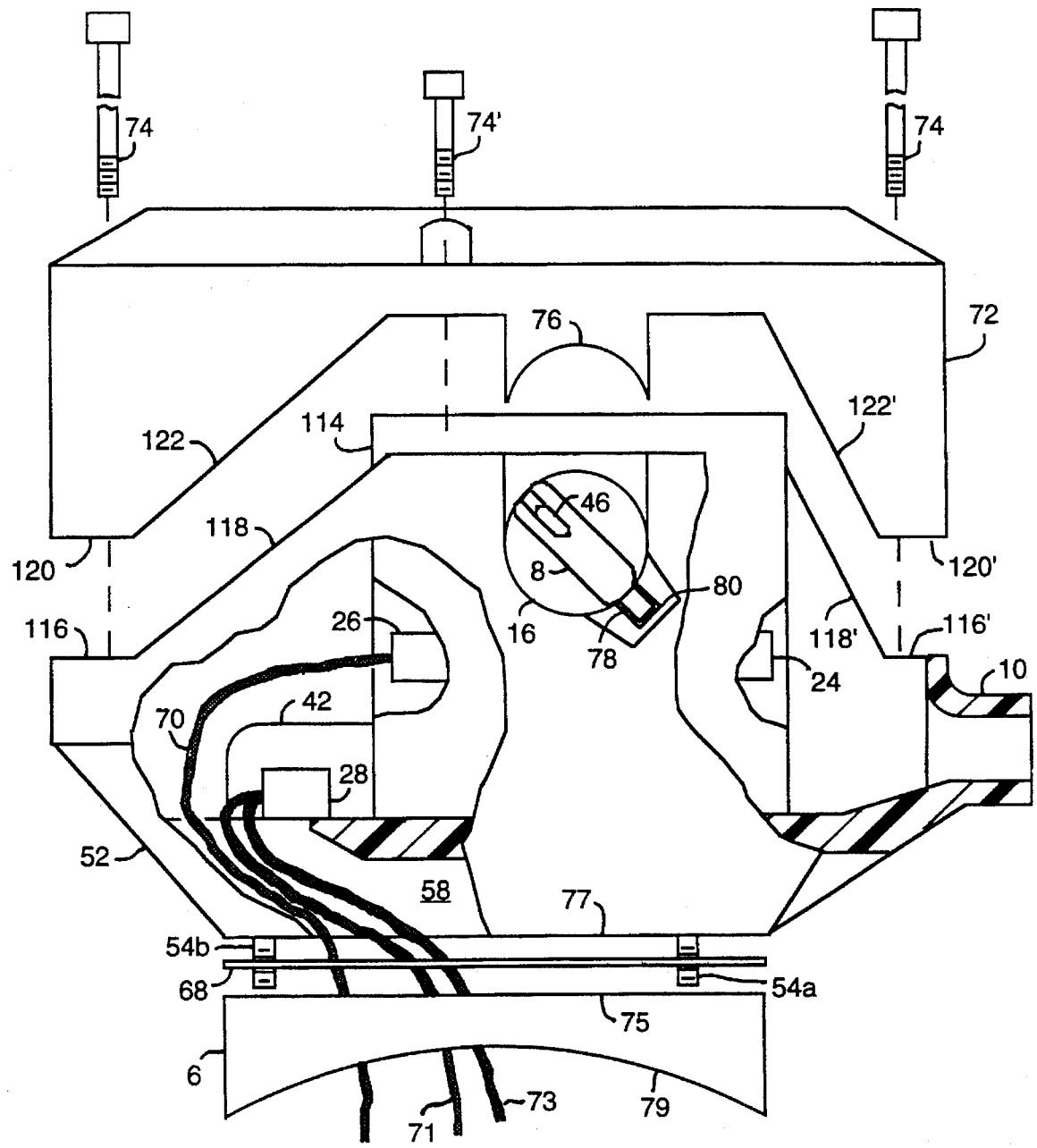
FIG. 13 is an elevation and partial sectional view of a third embodiment.

FIG. 13 shows a third embodiment which incorporates the functions of a motor controller into the body of the device as previously described. In this instance, a device known in the electrical trade as an integral starter 114 is incorporated into the motor mounted device described herein. The integral starter 114 combines the functions of a motor contactor, motor disconnect (which is controlled by the hand operator 8 and its related mechanisms), and magnetic and thermal motor overload protection. (Motor overload protection devices are not shown in the drawings as they are internal features of the integral starter 114 and are outside of the concern of this invention.) The integral starter 114 is equipped with both a line lug 24 and a load lug 26 for each respective motor phase.

Construction of this embodiment is similar to that shown in FIG. 6 with the exception that the larger physical size of the integral starter 114 requires modification of both the disconnecting device body 52 and body cover 72. As shown in the FIG. 13, the device body 52 has a reduced profile portion 116 with corresponding sloped walls 118, which allow better access to the line lugs 24 and load lugs 26 of the integral starter 114. The body cover 72 is configured accordingly at 120 and 122. Other construction and function details which are similar to FIG. 6 are identified with the reference characters as found in FIG. 6. Though not shown, this embodiment would include grounding means as identified in FIG. 6, wherein a grounding fastener 54a is in electrical contact with a ground lug 56 and a metal motor adapter plate 6 with a grounding sleeve 66 mounted in compression.

Figure 14:
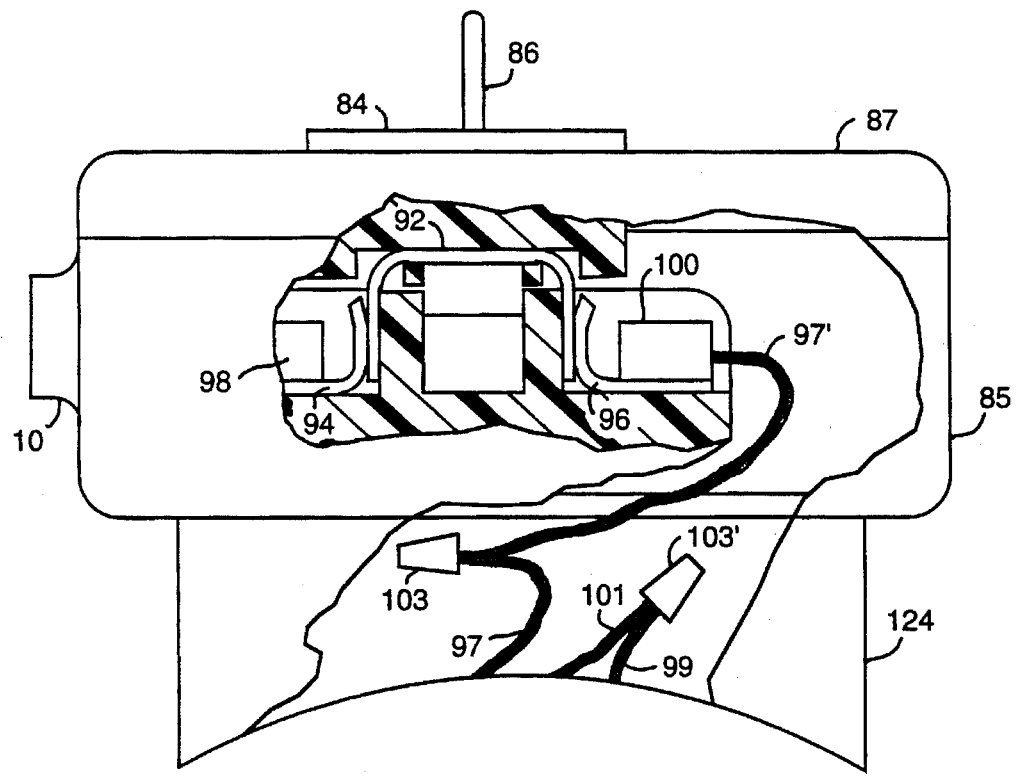
FIG. 14 is is an elevation and partial sectional view of a second embodiment with a modified adapter plate.

FIG. 14 shows the second embodiment of FIG. 8 with a modified adapter plate 124. The modified adapter plate 124 provides an area for the junction box function where motor tap wire leads 99 and 101 are connected. Additionally, a motor load lead 97 may be spliced with a wire nut connector 103, or other approved splicing device, with the extended motor load lead 97' routed to the appropriate load lug 100.

OPERATION

A primary consideration in evaluating operational advantages of this devise in any of its three embodiments is that of safety and ease of operation. From the perspective of operational safety, the ready access to a disconnecting means directly affixed to a motor affords the simplest and most secure opportunity for maintenance personnel to safely disable a motor-driven machine. With the added feature of a lock-out provision on the disconnecting device, maintenance personnel are assured of their own protection by the close proximity of the locking device to their area of work.

In addition to primary safety, the device represented in these embodiments may be used to simplify motor installations and reduce their cost. With the use of this device, the requirements of the National Electrical Code for a motor disconnecting device are satisfied without the addition of a separate electrical disconnect enclosure. In many cases, this will simplify the complexity of the motor installation and reduce material and labor costs.

The third embodiment which incorporates an integral starter into the terminal housing affixed to a motor offers potential economic and space saving advantages. In many cases, the motor installation can be greatly simplified because panel space for its control is not required extraneous to the motor proper. In a typical three phase motor installation using the third embodiment, a fused, central feeder panel would supply three phase conductors and two control conductors directly to the motor. There would be no need for breaks in the conduit run for controllers or disconnects; there would be a single conduit between the feeder panel and the motor.

In almost all electrical devices in which a current passes across contact points, the device is arranged so that the points close with a wiping action to establish optimum conductivity. In the first two embodiments, all contacts achieve this action. In the first embodiment, the contact pin 8 is drawn across the face of the line terminal member 20 and the load terminal member 22 in coming to the rest position. In the second embodiment, the movable contact 92 wipes across line contactor 94 and the load contactor 96 during the contact-make interval.

The auxiliary contacts (34 with 36 and 104) also close with a wiping action caused by either the cam action of the tumbler 16 or the motion of the closing draw-out assembly 84. In all cases where auxiliary contacts are used, the cam portion 38 of the tumbler or the insulated member 106 of the draw-out assembly 84 is timed so that the auxiliary contacts open before the main current carrying contacts open, and conversely, close after the main current carrying elements are again in contact. In this way, the main contacts are prevented from carrying the arcing load required in breaking the circuit. (However, the main contracts are rated such that they can withstand the circuit breaking load at full current conditions.)

In typical electric motor installations, two circuits are employed. The primary circuit consists of the high current carrying circuit which supplies the electrical power to the motor. This circuit is represented in FIGS. 7a and 7b as L1 (designated as 24), L2 (designated as 24'), and L3 (designated as 24'). A secondary, low power motor control switching circuit is also employed which controls the switching circuit for the motor. This low power switching circuit is controlled by the auxiliary contacts 34 and 36 in the first embodiment, and auxiliary contact 104 in the second embodiment.

Ideally, as noted above, the tumbler 16 is manipulated under non-operating conditions when the device is not carrying current. In some cases, however, it may be used to disconnect a motor under load, particularly in the case of emergences. When such is the case, arc suppression is needed between the respective line terminal member 20, contact pin 18, and load terminal member 22. By providing the tumbler 16 with annular grooves 62 into which an insulating partition projection 64 protrudes, an ionizing chamber 112 is created which suppresses the arc. Additionally, the annular groove 62 in conjunction with the insulating partition projection 64 reduces the occurrence of arcing between poles.

In the first two embodiments, resilient members are used to enhance the wiping effect. The line terminal member 20 is a resilient conductive material which causes the contact pin 18 to be held in compression and thus causes wiping. In the second embodiment, both the line contactor 94 and the load contactor 96 are resilient conductive elements and tensionably grip the movable contact 92 between themselves and molded body supports 108.

In the first embodiment, the contact pin 18 is further constructed so that it "floats" in the tumbler 16. This action assures that each contact pin 18 is independently free to center between its respective contact surfaces and establish optimum electrical contact.

Various pole combinations are possible in the first two embodiments. The majority of alternating current applications will be three phase (requiring three poles) or single phase (requiring two poles). For simplicity of manufacture, the most typical alternating current device would be supplied with three poles wherein only two of these three poles would be used for single phase applications.

For direct current applications some units would be required with as many as five poles. In these cases the armature poles (A1 and A2) and the series pole (S) would be capable of carrying higher current values than the shunt field poles (F1 and F2). Further, in direct current applications, additional timing may be provided wherein the armature poles (and the series field pole, when used) break before the shunt field poles. Such a timing sequence is simply achieved by rotationally displacing selected contact pins 18 in the tumbler 16 relative to other contact pins, or, by shortening the reach of selected movable contacts 92 relative to other movable contacts in the same draw-out assembly 84.

In some cases, the device may not be equipped with auxiliary contacts. This may be particularly true of the second embodiment used on small motors where the load is light and both physical size and the cost of the unit are major manufacturing considerations.

In operation, the switching function must be provided with a detente or stop action. In the first embodiment, this is primarily achieved with the detente 110 on the line terminal member 20 as shown In FIG. 2a. In the second embodiment, this may be simply achieved by means of the upper and lower limits of travel of the draw-out assembly 84. In both cases, additional provisions may be made in the mechanical structure of the tumbler 16 or draw-out assembly 84 to provide appropriate position indexing. As shown in FIG. 3, a toggle spring 41 may be used to cause the tumbler 16 to forcibly snap into either the open or closed position. The tumbler spring 41 is biased so that the tumbler 16 resists remaining in the mid-position of its travel. To avoid an abundance of detail in the drawings, appropriate travel limit stops and related details have not been shown. Such provision would be provided by the manufacturer.

In practice, the respective embodiment would be manufactured to accommodate a range of electric motor requirements. In all likelihood, units would be provided with the horsepower range of a commensurate motor magnetic starter. (That is, a size 0 motor starter rated for 480 volts will accommodate an alternating current motor from one horsepower to 5 horsepower. Similarly, a single size motor disconnecting device may be applicable for a 480 volt motor from one to 5 horsepower.) This standardization would reduce manufacturing costs. In all cases, according to NEC requirements, the contacts would be rated for one hundred and fifteen percent of the highest full load current permissible for the unit.

Optimum application of any embodiment of this device would most likely be from the equivalent of a size 00 magnetic motor starter (rated 2 horse power at 460 volts) to size 4½ (rated 150 horse power at 460 volts). It should be borne in mind that the limiting factor to maximum size is found in the economy of manufacturing, not in the design of the device.

The primary intended application for the various embodiments of this device would be at a maximum of 600 volts. In some cases, a draw-out device may be built with a 250 volt maximum usage; in most cases, however, the 600 volt unit would be permissible on any of the common voltages up to 600 volts.

In actual field use, this device would accommodate a wide range of electric motors. Either delta or wye connected alternating current motors, in addition to direct current motors, may be protected by this device. In many applications, the device is used only to control the incoming power leads and-optionally-an auxiliary contact. Motor taps may be connected in the provided space with appropriate splicing apparatus and do not require terminals as a part of the device itself.

The ease of adapting a given disconnecting unit to a wide range of motor sizes and types is achieved by the adapter plate 6. This affords the manufacturer a considerable cost savings in supplying a wide range of motors with appropriate disconnecting devices. In some cases, however, the adapter plate 6 may be eliminated by forming the disconnecting device body 52 (or 85) to conform directly to the body of the electric motor 4.

In order to accommodate the needs of a broad market range, three embodiments are offered. Discounting the motor tap provisions, the first two embodiments represent only disconnecting functions; the third embodiment represents a distinct category with a combination of motor disconnecting means and motor controlling capability.

The preferred disconnecting embodiment (as typified by FIG. 6), which is of higher cost, is generally manufactured to a NEMA 4 (rain tight) specification and additionally may include motor tap lugs 28 which are extraneous to the function of the disconnect unit. Whereas, the second embodiment, which is of lower cost, may be constructed as a NEMA 1 enclosure for general purpose use only and includes no additional termination points for motor winding taps. In some applications the second embodiment may not include auxiliary contacts.

The drawings indicate the use of nonmetallic (plastic) materials for the construction of the non-current carrying parts of all embodiments. In practice, this is economically preferable and in keeping with the exception clause of NEC 430-12 (a). Where the construction is of a plastic material, proper grounding provisions, such as the grounding sleeve 66, are required.

NEC 430-104 specifies that "The disconnecting means shall plainly indicate whether it is in the open (off) or closed (on) position." This is achieved by marking and color coding on the hand operator 8 or draw-out assembly 84.

The embodiments of the invention in which an exclusive property or privilege is claimed are defined below.

What we claim is:

1. A single enclosure immediately affixed to an electric motor, providing concurrently, in the first part, a terminal housing for incoming power supply lines and motor load lead connections and, in the second part, a power line disconnecting device, the apparatus comprising:
    a) a first element wherein incoming power supply lines feeding said electric motor are terminated onto two or more electrically isolated line lugs on the power supply side of a disconnecting means, and further, wherein each of said electrically isolated line lugs on said power supply side is electrically conductive with a respective electrically isolated line terminal member;
    b) a second element wherein electrical motor load leads to said electric motor are terminated onto two or more electrically isolated load lugs on a load side of said disconnecting means, and further, wherein each of said electrically isolated load lugs on said load side is electrically conductive with a respective electrically isolated load terminal member;
    c) a third element wherein a mechanically coupled rotary switching device causes to operate in unison two or more conductive members which are electrically isolated from each other, each of said conductive members being interposed between one of said electrically isolated line terminal members on said power supply side and one of said electrically isolated load terminal members on said load side, and,
    d) a fourth element wherein said rotary switching device is selectively and manually manipulated to close or open the electrical circuit between any electrically common pair of said electrically isolated line terminal members on said power supply side with said respective electrically isolated load terminal members on said load side.

2. An apparatus as defined in claim 1 wherein said rotary switching device employs at least two contact pins mounted within a rotary tumbler body; said contact pins having allowable limits of movement which enhance electrical contact between said electrically isolated line terminal members on said power supply side and said respective electrically isolated load terminal members on said load side.

3. An apparatus as defined in claim 1 which further employs the simultaneous operation of an electrically isolated auxiliary electrical contact switching means mechanically coupled with said rotary tumbler body whereby an electrical control circuit is sequentially activated when said rotary tumbler body is manipulated.

4. An apparatus as defined in claim 1 which further incorporates a mechanical toggle device whereby said rotary tumbler body is forcibly located into either extreme of said rotary tumbler body's travel, said toggle device actuated by an elastomeric member strainably mounted between said rotary tumbler body and an enclosure body, and further wherein said elastomeric member constrains said rotary tumbler body into either extreme of said rotary tumbler body's travel.

5. An apparatus as defined in claim 1 which further employs within said rotary switching device an arc suppression chamber wherein an electrical arc initiated by opening said conductive member interposed between one of said electrically isolated line terminal members on said power supply side and one of said electrically electrically isolated load terminal members on said load side is extinguished through a tortuous air path, said arc suppression chamber consisting of at least two annular grooves within said rotary tumbler body into which project at least two insulating partitions from said enclosure body.

6. An apparatus as defined in claim 1 which further employs a grounding conductor in a non-conductive housing body by incorporating a metallic grounding sleeve cooperating with a ground lug and a conductive grounding fastener between said device body and a conductive mounting device in electrical contact with the motor ground.

7. An apparatus as defined in claim 1 which further employs a locking means provided on the exterior portion of said rotary tumbler body to restrain said rotary tumbler body in a position wherein said conductive members within said rotary tumbler body are electrically open.

8. An apparatus as defined in claim 1 which further employs said single enclosure immediately affixed to an electric motor with motor tap lugs, said motor tap lugs supplying connection terminals for said internal motor tap wires wherein said internal motor tap wires are requisite to the electrical connection of said electric motor, but are extraneous to said load side electrical connections.

9. An apparatus as defined in claim 1 which further employs an adapter plate on one plane conformable to a mounting surface of said single enclosure immediately affixed to an electric motor, and further employs said adapter plate on another plane conformable to said electric motor; whereby a multiplicity of said adapter plates mate said single enclosure to a multiplicity of motor case configurations.

10. The adapter plate of claim 9 wherein space is provided for the splicing of motor tap wires requisite to the electrical connection of said electric motor, but extraneous to said load side electrical connections to said electric motor.

11. A single enclosure immediately affixed to an electric motor, providing concurrently, in the first part, a terminal housing for incoming power supply lines and motor load lead connections and, in the second part, a power line disconnecting device, the apparatus comprising:

a) a first element wherein said incoming power supply lines feeding said electric motor are terminated onto two or more electrically isolated line lugs on said power supply side of a disconnecting means, and further, wherein each of said electrically isolated line lugs on said power supply side is electrically conductive with a respective electrically isolated line terminal member;

b) a second element wherein electrical motor load leads to said electric motor are terminated onto two or more electrically isolated load lugs on a load side of said disconnecting means, and further, wherein each of said electrically isolated load lugs on said load side is electrically conductive with a respective electrically isolated load terminal member;

c) a third element wherein a draw-out switching assembly causes to operate in unison two or more movable contact members which are electrically isolated from each other, each of said movable contact members being mechanically coupled to said common insulated draw-out switching assembly, and further, wherein each of said movable contact members are interposed between one of a multiplicity of electrically isolated line contactors on said power supply side and a cooperating electrically isolated load contactor which is one of a multiplicity of said electrically isolated load contactors on said load side, and, d) a fourth element wherein said draw-out switching assembly is selectively and manually manipulated to close or open the electrical circuit between any electrically common pair of said electrically isolated line contactor members on said power supply side with its said respective electrically isolated load contactor member on said load side.

12. An apparatus as defined in claim 11 which further employs the simultaneous operation of an electrically isolated auxiliary electrical contact switching means mechanically coupled with said draw-out switching body whereby an auxiliary electrical circuit is sequentially controlled when said draw-out switching body is manipulated.

13. An apparatus as defined in claim 11 which further employs a grounding conductor in a non-conductive housing body by incorporating a metallic grounding sleeve cooperating with a ground lug and a conductive fastener between said device body and a conductive mounting device in contact with the motor ground.

14. An apparatus as defined in claim 11 which further employs a locking means provided on the exterior portion of said draw-out device body to restrain said draw-out device body in a position wherein said conductive members within said draw-out device body are electrically open.

15. An apparatus as defined in claim 11 which further employs an adapter plate on one plane conformable to a mounting surface of said single enclosure immediately affixed to an electric motor, and further employs said adapter plate on another plane conformable to said electric motor; whereby a multiplicity of said adapter plates mate said single enclosure to a multiplicity of motor case configurations.

16. An apparatus as defined in claim 11 which further employs said single enclosure immediately affixed to an electric motor with motor tap lugs, said motor tap lugs supplying connection terminals for said internal motor tap wires wherein said internal motor tap wires are requisite to the electrical connection of said electric motor, but are extraneous to said load side electrical connections.

17. An apparatus as defined in claim 15 wherein said adapter plate is constructed so that sufficient space is provided for the splicing of motor tap wires requisite to the electrical connection of said electric motor, but extraneous to said load side electrical connections to said electric motor.

18. A single enclosure immediately affixed to an electric motor, providing an integral motor starting device, said integral motor staring device encompassing the functions of a motor starter, motor thermal and magnetic overload protection, auxiliary contact control, and a motor disconnecting device, the apparatus comprising:

a) a first element wherein incoming power supply lines feeding said electric motor are terminated onto two or more of said electrically isolated line lugs on the power supply side of said integral motor starting device;

b) a second element wherein electrical motor load leads to said electric motor are terminated onto two or more electrically isolated load lugs on said load side of said integral motor controlling device;

c) a third element wherein said integral motor starting device is selectively and manually manipulated to close or open the electrical circuit between any electrically common pair of said electrically isolated line terminal members on said power supply side with said respective electrically isolated load terminal members on said load side, and, d) a fourth element wherein said integral motor controlling device will automatically open the electrical motor load circuit between any electrically common pair of said electrically isolated line terminal members on said power supply side with said respective electrically isolated load terminal members on said load side upon attainment of a predetermined motor load condition.

19. An apparatus as defined in claim 18 wherein space is provided within said single enclosure to accommodate and terminate all other of said field selectable motor tap wires which are extraneous to the function of said integral motor controlling device but are requisite to the electrical connection of said electric motor.

20. An apparatus as defined in claim 18 which further employs a locking means provided on the exterior portion of said single enclosure of said integral motor controlling device to restrain said integral motor controlling device in an electrically non-conductive state.

21. An apparatus as defined in claim 18 which further employs an adapter plate on one plane conformable to a mounting surface of said single enclosure immediately affixed to an electric motor, and further employs said adapter plate on another plane conformable to said electric motor; whereby a multiplicity of said adapter plates mate said single enclosure to a multiplicity of motor case configurations.

22. An apparatus as defined in claim 21 wherein said adapter plate is constructed so that sufficient space is provided for the splicing of motor tap wires requisite to the electrical connection of said electric motor, but extraneous to said load side electrical connections to said electric motor.

* * * * *